US012694226B2

(12) United States Patent
Jin

(10) Patent No.: US 12,694,226 B2
(45) Date of Patent: Jul. 28, 2026

(54) METHOD AND APPARATUS FOR CONSISTENCY DETECTION AND RESOLUTION IN AUTOMATIC DIALOGUE SYSTEMS

(71) Applicant: Tencent America LLC, Palo Alto, CA (US)

(72) Inventor: Lifeng Jin, Mill Creek, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 267 days.

(21) Appl. No.: 18/529,055

(22) Filed: Dec. 5, 2023

(65) Prior Publication Data

US 2025/0181838 A1 Jun. 5, 2025

(51) Int. Cl.
*H04L 51/02* (2022.01)
*G06F 40/35* (2020.01)

(52) U.S. Cl.
CPC .............. *G06F 40/35* (2020.01); *H04L 51/02* (2013.01)

(58) Field of Classification Search
None
See application file for complete search history.

(56) References Cited

U.S. PATENT DOCUMENTS

| | | | |
|---|---|---|---|
| 2014/0096249 A1 | 4/2014 | Dupont et al. | |
| 2019/0237061 A1* | 8/2019 | Rusak ................... | G06F 40/216 |
| 2019/0272323 A1 | 9/2019 | Galitsky | |
| 2021/0192283 A1 | 6/2021 | Guo et al. | |
| 2022/0269868 A1 | 8/2022 | Song | |
| 2022/0383864 A1 | 12/2022 | Gruber et al. | |

OTHER PUBLICATIONS

International Search Report issued Sep. 23, 2024 in International Application No. PCT/US2024/038465.
Written Opinion issued Sep. 23, 2024 in International Application No. PCT/US2024/038465.

* cited by examiner

*Primary Examiner* — Quynh H Nguyen
(74) *Attorney, Agent, or Firm* — Sughrue Mion, PLLC

(57) ABSTRACT

A method for performing consistency detection in a dialogue system includes training a model based on an annotated dataset for consistency detection to generate a trained model. The method further includes receiving a plurality of utterances from one or more users. The method includes determining, using the trained model, whether the plurality of utterances include an inconsistency. The method includes, based on the determination that the plurality of utterances include the inconsistency, generating, using the trained model, one or more clarifying responses.

18 Claims, 7 Drawing Sheets

700

S702 Train a model based on an annotated dataset for consistency detection to generate a trained model S704 Receive a plurality of utterances from one or more users S706 Determining, using the trained model, whether the plurality of utterances include an inconsistency S708 Based on the determination of the inconsistency, generate, using the trained model, one or more clarifying responses

300

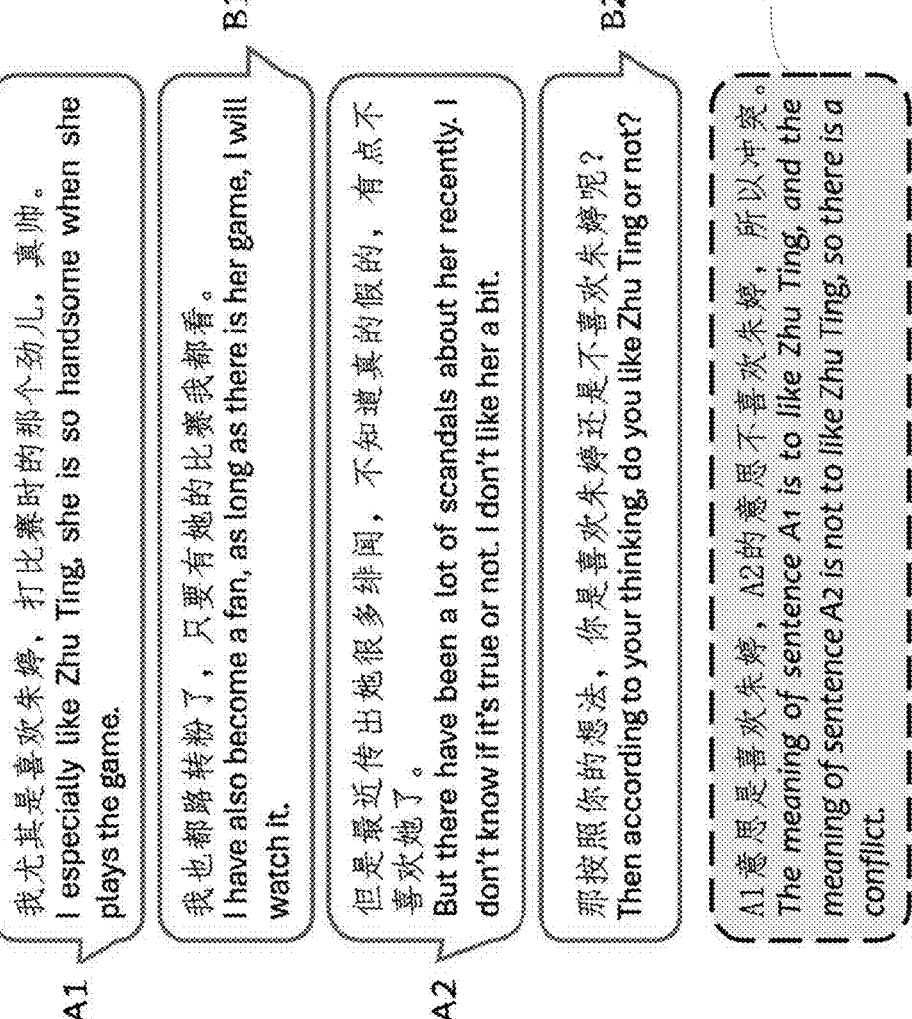

A1

我尤其是喜欢朱婷，打比赛时的那个劲儿，真帅。
I especially like Zhu Ting, she is so handsome when she plays the game.

B1

我也都路转粉了，只要有她的比赛我都看。
I have also become a fan, as long as there is her game, I will watch it.

但是最近传出她很多绯闻，不知道真的假的，有点不喜欢她了。
But there have been a lot of scandals about her recently. I don't know if it's true or not. I don't like her a bit.

A2

那按照你的想法，你是喜欢朱婷还是不喜欢朱婷呢？
Then according to your thinking, do you like Zhu Ting or not?

B2

A1意思是喜欢朱婷，A2的意思不喜欢朱婷，所以冲突。
The meaning of sentence A1 is to like Zhu Ting, and the meaning of sentence A2 is not to like Zhu Ting, so there is a conflict.

| | LCCC | | | NaturalConv | | |
|---|---|---|---|---|---|---|
| | Train | Dev | Test | Train | Dev | Test |
| # of Convs | 14,126 | 1,883 | 1,797 | 7,537 | 917 | 920 |
| Ave. Cont. Len. | 29.3 | 28.9 | 28.9 | 40.4 | 40.9 | 40.5 |
| Ave. Exp. Len. | 40.9 | 40.5 | 41.0 | 50.4 | 50.3 | 50.3 |
| Ave. Res. Len. | 16.2 | 16.1 | 16.1 | 20.3 | 20.1 | 20.0 |

TABLE 1

FIG. 4

(a) Performance of Pair-Check checkers.

| | STANCE Test | | | OCNLI Test | | | CDCConv Test (Turn) | | | CIDER Test (Turn) | | |
|---|---|---|---|---|---|---|---|---|---|---|---|---|
| | Pre. | Rec. | F1 | Pre. | Rec. | F1 | Pre. | Rec. | F1 | Pre. | Rec. | F1 |
| $C^{Turn}_{STANCE}$ | 72.8 | 60.4 | 66.0 | 37.7 | 19.4 | 25.7 | 38.1 | 21.3 | 27.4 | 37.5 | 14.4 | 20.8 |
| $C^{Turn}_{OCNLI}$ | 31.6 | 36.1 | 33.7 | 72.9 | 74.9 | 73.9 | 51.3 | 37.3 | 43.2 | 35.7 | 37.4 | 36.5 |
| $C^{Turn}_{CDCConv}$ | 41.8 | 8.1 | 13.6 | 40.9 | 15.0 | 22.0 | 56.3 | 72.9 | 63.5 | 29.8 | 42.8 | 35.1 |
| $C^{Turn}_{CIDER}$ | 61.0 | 44.8 | 51.7 | 30.7 | 76.2 | 63.7 | 37.7 | 69.3 | 48.8 | 76.2 | 69.3 | 72.6 |

(b) Performance of Diag-Check checkers.

| | STANCE Test | | | OCNLI Test | | | CDCConv Test (Diag) | | | CIDER Test (Diag) | | |
|---|---|---|---|---|---|---|---|---|---|---|---|---|
| | Pre. | Rec. | F1 | Pre. | Rec. | F1 | Pre. | Rec. | F1 | Pre. | Rec. | F1 |
| $C^{Turn}_{STANCE}$ | 72.8 | 60.4 | 66.0 | 37.7 | 19.4 | 25.7 | 25.9 | 4.5 | 7.6 | 48.4 | 21.8 | 30.0 |
| $C^{Turn}_{OCNLI}$ | 31.6 | 36.1 | 33.7 | 72.9 | 74.9 | 73.9 | 46.6 | 37.6 | 41.6 | 52.5 | 42.7 | 47.1 |
| $C^{Diag}_{CDCConv}$ | 54.5 | 8.7 | 15.0 | 31.5 | 16.2 | 21.4 | 62.5 | 60.8 | 61.7 | 61.3 | 8.3 | 14.6 |
| $C^{Diag}_{CIDER}$ | 38.8 | 55.2 | 45.6 | 33.7 | 32.4 | 33.1 | 52.7 | 14.7 | 23.0 | 89.4 | 91.6 | 90.5 |

TABLE 2

FIG. 5

| Model | Pair-Resolve | | | | Diag-Resolve | | | |
|---|---|---|---|---|---|---|---|---|
| | BLEU | R-1 | R-2 | R-L | BLEU | R-1 | R-2 | R-L |
| #1 T5 | 26.9 | 55.3 | 33.0 | 52.2 | 14.8 | 43.0 | 20.6 | 40.4 |
| #2 BART | $28.2_{+1.3}$ | $57.2_{+1.9}$ | $34.8_{+1.8}$ | $53.7_{+1.5}$ | $14.9_{+0.1}$ | $43.7_{+0.7}$ | $21.7_{+1.1}$ | $41.0_{+0.6}$ |
| #3 T5$_{oracle}$ | 46.2 | 71.5 | 53.0 | 68.3 | 46.7 | 71.7 | 53.2 | 68.3 |
| #4 BART$_{oracle}$ | $49.4_{+3.2}$ | $74.4_{+2.9}$ | $56.2_{+3.2}$ | $70.7_{+2.4}$ | $47.4_{+0.7}$ | $72.4_{+0.7}$ | $53.9_{+0.7}$ | $68.7_{+0.4}$ |
| #5 ChatGPT | 14.3 | 45.2 | 22.2 | 41.4 | 5.3 | 29.8 | 9.9 | 26.9 |
| #6 GPT4 | 10.8 | 42.7 | 20.2 | 38.0 | 4.1 | 28.0 | 9.8 | 24.2 |

TABLE 3

FIG. 6

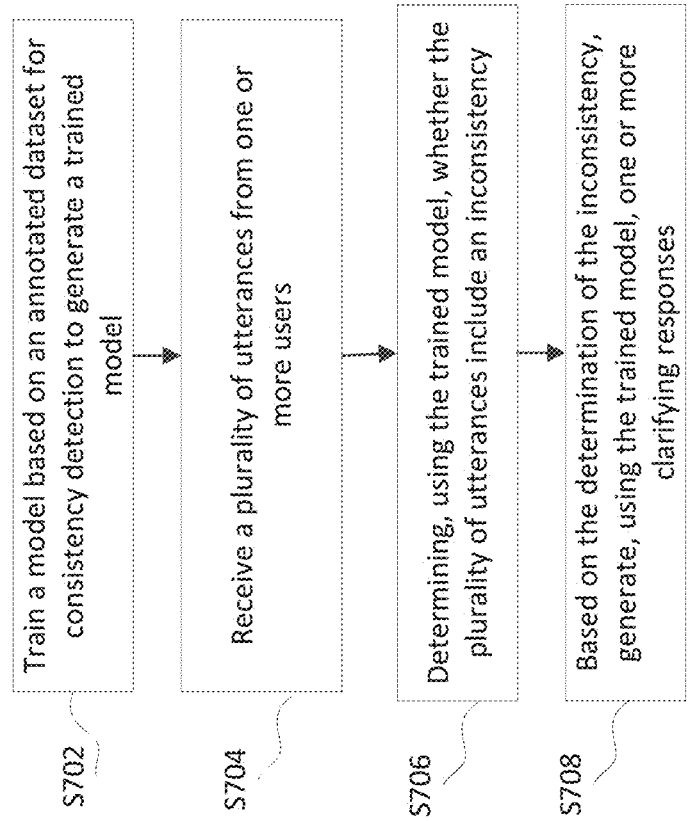

S702   Train a model based on an annotated dataset for consistency detection to generate a trained model S704   Receive a plurality of utterances from one or more users S706   Determining, using the trained model, whether the plurality of utterances include an inconsistency S708   Based on the determination of the inconsistency, generate, using the trained model, one or more clarifying responses

METHOD AND APPARATUS FOR CONSISTENCY DETECTION AND RESOLUTION IN AUTOMATIC DIALOGUE SYSTEMS

FIELD

The disclosure generally relates to consistency detection and resolution in automatic dialogue systems.

BACKGROUND

For years, inconsistencies in human-to-chatbot conversations have been evident, even in the era of large language models. These inconsistencies may be categorized as either extrinsic or intrinsic. Extrinsic inconsistencies arise when there is a discrepancy between a statement and an external source of information, such as a knowledge base. Intrinsic inconsistencies occur within the dialogue itself. These inconsistencies can occur in two ways: through an intra-utterance contradiction, where a single sentence contains conflicting information, or a history contradiction, where a current statement conflicts with a previous one. A persistent challenge in conversational models exists due to the nature of language modeling. That is, models could forget what is outputted due to intervening context.

SUMMARY

According to one or more embodiments, a method for performing consistency detection in a dialogue system comprises training a model based on an annotated dataset for consistency detection to generate a trained model; receiving a plurality of utterances from one or more users; determining, using the trained model, whether the plurality of utterances include an inconsistency; and based on the determination that the plurality of utterances include the inconsistency, generating, using the trained model, one or more clarifying responses.

According to one or more embodiments, an apparatus method for performing consistency detection in a dialogue system, comprises at least one memory configured to store program code; and at least one processor configured to read the program code and operate as instructed by the program code, the program code including: training code configured to cause the at least one processor to train a model based on an annotated dataset for consistency detection to generate a trained model, receiving code configured to cause the at least one processor to receive a plurality of utterances from one or more users, determining code configured to cause the at least one processor to determine, using the trained model, whether the plurality of utterances include an inconsistency, and generating code configured to cause the at least one processor to, based on the determination that the plurality of utterances include the inconsistency, generate using the trained model, one or more clarifying responses.

According to one or more embodiments, a non-transitory computer readable medium having instructions stored therein, which when executed by a processor cause the processor to execute a method for performing consistency detection in a dialogue system, the method comprising: training a model based on an annotated dataset for consistency detection to generate a trained model; receiving a plurality of utterances from one or more users; determining, using the trained model, whether the plurality of utterances include an inconsistency; and based on the determination that the plurality of utterances include the inconsistency, generating, using the trained model, one or more clarifying responses.

BRIEF DESCRIPTION OF THE DRAWINGS

Further features, the nature, and various advantages of the disclosed subject matter will be more apparent from the following detailed description and the accompanying drawings in which:

FIG. 3 is an illustration of an annotated dataset, according to embodiments.

FIG. 4 is a table illustrating statistics of annotated datasets.

FIG. 5 is a table of performance statistics.

FIG. 6 is a table of performance of resolvers.

FIG. 7 is a flowchart of an example process for checking consistency, according to embodiments.

DETAILED DESCRIPTION

Figure 1:
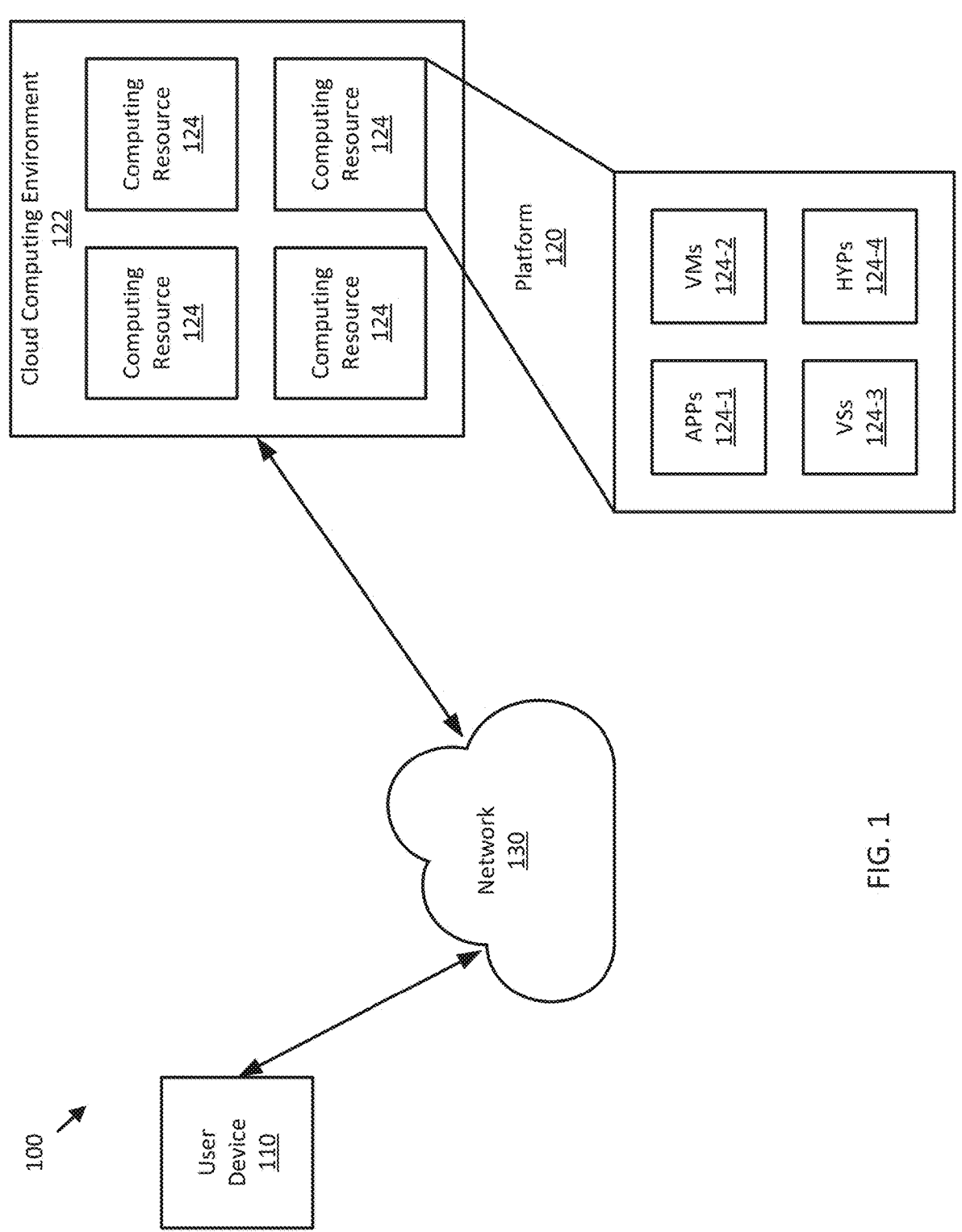
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSS) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g.

"guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
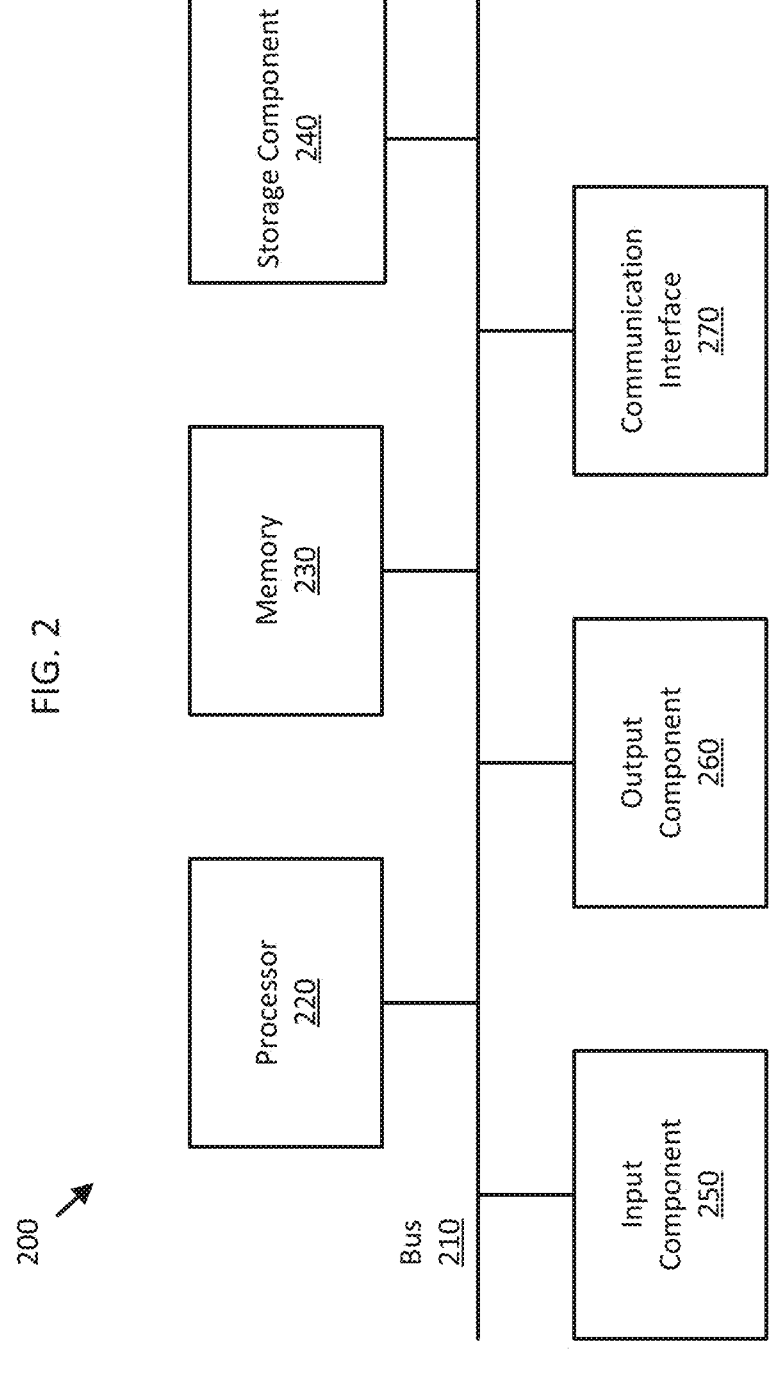
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Embodiments of the present disclosure are directed to detecting an inconsistency in a dialogue. A critical issue for chat systems is to stay consistent about preferences, opinions, beliefs and facts of itself, which is a difficult problem to solve. The embodiments of the present disclosure are directed to methods to assess and bolster utterance consistency of chat systems. A dataset is first developed for studying the inconsistencies, where inconsistent dialogue responses, explanations of the inconsistencies, and recovery utterances are authored by annotators using an annotation process according to embodiments of the present disclosure. This process covers the life span of inconsistencies, including introduction, understanding, and resolution. A set of tasks are introduced centered on dialogue consistency, specifically focused on inconsistency detection and resolution. Results show that models designed and trained according to the embodiments of the present disclosure detect and resolve inconsistencies found in automatically generated dialogue responses. The results also indicate that the annotated dataset of the embodiments of the present disclosure significantly helps the progress in identifying and resolving conversational inconsistencies.

Researchers have been actively exploring how to resolve inconsistencies between utterances generated by conversational models in recent years. Some methods have made progress in this domain by enhancing the training of these models, incorporating additional features and objectives to bolster self-consistency. Furthermore, some methods introduced decoding algorithms aimed at fostering greater coherence in utterances. These preemptive approaches are designed to mitigate conversational inconsistencies by reducing the likelihood of generating responses that contradict previous dialogue. However, these approaches cannot resolve the inconsistencies that do occur, possibly from the user or from model errors.

Therefore, there is a need to address inconsistencies that do arise from the user or from model errors. Various remedial techniques, including grammar error correction and moderating inappropriate dialogue content, may generate clarifying questions in information retrieval and conversational question answering. However, there is a significant gap in the research when it comes to directly addressing inconsistencies that occur between utterances.

According to one or more embodiments, a dataset with 27,180 dialogues to study inconsistencies between utterances is generated. In one or more examples, a dataset, called CIDER, covers a whole life span of inconsistencies. The lifespan of an inconsistency may include an introduction, understanding, and resolution.

FIG. 3 illustrates an example dialogue 300 in CIDER. For example, for each dialogue, annotators are first asked to write an utterance with inconsistent content regarding one utterance in the history to continue the conversation, and then explain why the two utterances are inconsistent with natural language, and finally provide a clarification response to continue the dialogue to resolve the inconsistency. For example, the dialogue 300 may include the utterance A1 with a corresponding response B1. The utterance A1 may be a speaker, while the response B1 may be a second speaker, a bot, or an annotator. The annotator may provide utterance A2, which is intended to be inconsistent with the utterance A1. The response B2 may be provided by the second speaker, the bot, or the annotator. The annotator may further provide a clarification response 302 that provides an explanation why utterance A2 is inconsistent with utterance A1.

Based on the large collection of inconsistent utterances paired with clarifying responses, the CIDER dataset is a valuable resource for researching strategies to mitigate conversational inconsistencies.

Utilizing the CIDER dataset, comprehensive experiments and analyses were conducted to study dialogue inconsistencies. The results demonstrate that the CIDER dataset advantageously facilitates the development of robust inconsistency checkers compared to models trained on comparable public datasets. Furthermore, the results indicate that classic models like T5 and BART face challenges in adeptly resolving inconsistencies by providing clarifying responses. When assessing the proficiency of large language models (LLMs) in identifying and resolving conversational inconsistencies, the following two key points were determined: 1) LLMs, when employed as inconsistency checkers, still leave much to be desired in terms of performance; and 2) in contrast, as resolvers of inconsistency, LLMs exhibit a higher success rate compared to a fully supervised BART resolver.

According to one or more embodiments, in a first part, an annotation process and guidelines for a dataset focusing on the inconsistency problem is designed. A second part includes the design of the CIDER dataset itself. The third part includes the different ways that dialogue inconsistencies can be resolved: inconsistency checking and inconsistency resolution with machine learning models trained on the CIDER dataset.

In one or more examples, the candidate conversations for annotation are sampled from two open-source conversation datasets: LCCC and NaturalConv. LCCC may be a large collection of short conversations from the Chinese social media platform Weibo or any other suitable source known to one of ordinary skill in the art. NaturalConv is an annotator-written dataset containing conversations around news items on topics like film and sports. They are different in content and style. LCCC conversations tend to be short in number of turns, and more in the style of daily chitchat. NaturalConv conversations, in contrast, are two to five times longer and contain more serious discussions about events in sports, films, and other areas.

20,000 and 10,000 conversations are sampled from the LCCC and NaturalConv respectively for annotation. In one or more examples, when sampling, conversations that are shorter than 4 turns or contain utterances shorter than 5 words may be filtered out.

The sampled conversations may be generally consistent. Therefore, the goal of data annotation is to create an alternative conversation that contains inconsistent utterances. To achieve this goal, in one or more examples, the original conversation may be truncated to create a common conversation context. For LCCC, the last utterance may be truncated for inconsistent continuation writing. For NaturalConv, a random turn between 8 and 1-4 and the following turns are chosen for truncation, where l is the length of the conversation.

In one or more examples, a specified source turn may be sampled from the last turn or the turn before the last. This source turn may be designated to be the source of the inconsistency where the following inconsistent continuation needs to form an inconsistency with the utterance from the same speaker in this turn.

In one or more examples, the annotation process may be divided into three different tasks: (i) inconsistent continuation, (ii) inconsistency explanation, and (iii) inconsistency resolution. These tasks may be performed for each candidate conversation by one or more annotators when given a candidate conversation and a specified source turn.

As an example of inconsistent continuation, the annotator first tries to create a natural continuation of the conversation by providing a possible utterance to the candidate conversation, but forms an inconsistency with the specified source utterance (A2 in FIG. 1 is the continuation, and A1 is the source.) The annotators are instructed to write the utterance with contradictory viewpoints, reasoning, and argumentation, instead of providing simple negation to the source utterance. For example, for the specified utterance "I went to the supermarket yesterday," the continuation meeting the annotation requirement is "I have been staying home for the past four days, not really wanting to go anywhere," instead of "I didn't go to the supermarket yesterday."

In one or more examples, after writing the continuation of the candidate conversation, the annotator may be instructed to write down the rationale behind the created inconsistency (e.g., 302 in FIG. 1). The annotator may be requested to follow a template when writing the rationale such as: The specified utterance means X, but the continuation utterance means Y, which is in contradiction with X, where the utterance meanings should be explicit. In the example above, the explanation annotator may write is: The specified utterance indicates that "I went out of my home yesterday," but the continuation utterance means that "I didn't go out for many days including yesterday," which is in contradiction with the previous statement.

In one or more examples, the annotator may provide another utterance to expose and question the inconsistency from a different party than the continuation party (e.g., B2 in FIG. 1). The annotator may be requested to write the resolution question naturally with the main purpose of clarifying the situation instead of complaining or pointing out the inconsistency. The annotator may also be asked to try varying how the clarification question is raised since the most intuitive way of asking is by providing a binary choice. For example, the resolution question for the example may be: "So were you home yesterday or did you go to the supermarket?".

Twelve examples collected from the two data sources and annotated by the authors were provided to the annotators along with the guidelines, which cover a number of common mistakes that the annotators discovered in the trial annotation. The annotation project lasted two months, with six annotators participating in the project from a commercial annotation provider, who was chosen amongst three providers based on the performance in the trial annotation task. The items for annotation were segmented into batches, each with 3000 conversations. The annotated items were checked first by quality assurance specialists from the annotation provider by batch, and then spot-checked by the annotators with the acceptance rate setting at 95%.

In one or more examples, candidate conversations which are not possible to form inconsistencies, such as conversations containing mostly utterances of simple greeting or agreeing, were dropped in the annotation process.

In one or more examples, after annotation, 17,806 conversations from LCCC and 9,374 conversations from NaturalConv have valid annotation. They are further split into train, dev and test sets, shown in Table 1 of FIG. 4. The average continuation and explanation lengths from LCCC conversations are substantially shorter than from Natural-Conv, indicating the simple nature of social media conversations. The resolution question lengths are closer than the other lengths, showing that resolution questions tend to be less influenced by context and style.

In one or more examples, the comprehensive annotation of the CIDER dataset supports two major usages for mitigating conversational inconsistent behaviors: (i) a checker predicting an utterance being inconsistent or not, and (ii) a resolver generating inconsistency resolutions. For inconsistency checking, the CIDER dataset helps the detection of inconsistency in conversation via two task settings: (1) checking the consistency between two sentences (Pair-Check); and (2) checking the consistency between an utterance and its preceding context (Diag-Check). The (inconsistency) checker may be initialized as ROBERTa-base with a linear binary classification head on the top. The input of the encoder for Pair-Check is formatted as "[CLS] {sentence 1} [SEP] {sentence 2} [SEP]" while for Diag-Check, "[CLS] {context} [SEP] {utterance} [SEP]", where the [CLS] and [SEP] are special tokens. The \data { } is compared with the following mentioned datasets.

CDConv: a dataset with 12K dialogues for conversational contradiction detection. Compared to CIDER, CDConv covers another two types of contradiction: intra-sentence contradiction and role confusion. Each dialogue of CDConv may contain two turns of utterances between a user and a bot and annotation of consistent or inconsistent between the replies of the bot.

STANCE: a dataset for stance classification of articles of debating topics from online forums, where sentence pairs against each other are marked as inconsistent and otherwise consistent.

OCNLI: a large-scale natural language inference (NLI) dataset, consisting of about 56,000 annotated sentence pairs. Sentence pairs with contradiction may be labeled as inconsistent and sentence pairs without contradiction as consistent.

In one or more examples, for inconsistency resolution, the base version of two representative conditional generative models to initialize the resolver may be used: BART and T5. These two models both follow an encoder-decoder structure and generate clarification responses in a sequence-to-sequence fashion. For example, the conversational text with inconsistency is fed into the encoder and the clarification response is generated auto-aggressively by the decoder. The resolver may be set up with two task settings: (1) generating a clarification response for a pair of inconsistent utterances (Pair-Resolve); (2) generating a clarification response for a dialogue, of which the current response is inconsistent to the preceding context (Diag-Resolve). In one or more examples, the input of the encoder for Pair-Resolve may be formatted as "[CLS] {utterance 1} [SEP] {utterance 2} [SEP]" while for Diag-Resolve, "[CLS] {context} [SEP] {response} [SEP]". We use BLEU and ROUGE scores, including ROUGE-1 (R-1), ROUGE-2 (R-2) and ROUGE-L (R-L), to measure the similarity between the generated text and the ground truth.

In one or more examples, an inconsistency may be determined using a pair check, where a determination is made whether an inconsistency exists between a pair of utterances (e.g., utterance 1 and utterance 2). In one or more examples, an inconsistency may be determined using a diagonal resolve check, where a determination is made whether an inconsistency exists between an utterance and two or more prior utterances.

The performance of checkers trained on different datasets for Pair-Check is demonstrated in Table 2 (a) (FIG. 5). For each checker, the performance on all the test sets of the evaluating datasets are illustrated. There is a substantial distribution difference between the datasets with the checker trained on one dataset performing the best on the corresponding test set. $C^{Turn}$ has the largest exceeding F1 points over the second best, 36.1, indicating that the checker trained on other datasets is not good at detecting the consistency in the test set of CIDER and the training set of CIDER could provide useful supervision for it. Moreover, the 0-shot transfer ability of checkers across the datasets is compared. Results show that $C^{Turn}$ has the best transfer results on all the other three datasets, surpassing the second best by 18.0, 38.0, and 5.6 F1 points, respectively, demonstrating $C^{Turn}$ covering many similar linguistic phenomena in other datasets. On the whole, CIDER provides robust supervision to check whether a pair of sentences are consistent, regardless of they are in a dialogue or not.

The performance of the checkers trained on different datasets for Diag-Check is demonstrated in Table 3(b) (FIG. 5). The results of $$C_{CDCONV}^{Diag}$$

and $C^{Diag}$ indicate again the distribution difference between CIDER and CDConv also being significant for Diag-Check task: CIDER does not cover role confusion and intra-sentence contradiction of these two types of inconsistency while being much larger than CDConv. Furthermore, $C^{Diag}$, outperforms $$C_{CDCONV}^{Diag}$$

on STANCE Test by 30.6 F1 points and on OCNLI Test by 11.7 F1 points, which demonstrates better transferring ability of $C^{Diag}$ to non-conversational scenarios. Therefore, along with the transferring results in Table 3 (a), CIDER offers more transferable patterns for checking consistency, and may be complementary to CDConv in the conversational scenarios. It is also observed that $$C_{OCNLI}^{Turn}$$

is superior to $C^{Diag}$ on CDConv Test (Diag) and to $$C_{CDCONV}^{Diag}$$

on CIDER Test (Diag), showing that the knowledge of inconsistency between sentences in OCNLI is also useful for the inconsistency checking in dialogue.

According to rows #1 and #2 in Table 3 (FIG. 6), BART shows better performance in both Pair-Resolve and Diag-Resolve tasks than T5, indicating the pre-trained parameters of BART are more suitable to inconsistency resolving. The points of Pair-Resolve are higher than those of Diag-Resolve, which could be ascribed to Diag-Resolve being a more difficult task than Pair-Resolve because recognizing inconsistent contents between conversational context and a response is harder than between a pair of sentences. In one or more examples, explanations are appended to the input of the encoder to aid the generation process. Specifically, the input becomes "[CLS] {utterance 1} [SEP] {utterance 2} [SEP] {explanation} [SEP]" for Pair-Resolve and "[CLS] {context} [SEP] {response} [SEP] {explanation} [SEP]" for Diag-Resolve. The models with explanation are denoted as T5oracle and BARToracle, whose performances are shown at rows #3 and #4 in Table 6. It is observed that T5oracle and BARToracle surpass T5 and BART by a significant margin, showing that with \textit{explanations} informing what inconsistency the input delivers, the models are able to produce clarification responses more semantically similar to the ground truth. Moreover, BARToracle performs better than T5oracle across all the metrics, demonstrating BART is better at exploiting explanations to resolve semantic inconsistency.

FIG. 7 is a flowchart of an example process 700 for checking consistency in a dialogue, according to embodiments. The process may be performed by processor 220 (FIG. 2).

The process may start at operation S702 where a model is trained based on an annotated dataset for consistency detec-tion to generate a trained model. For example, the annotated dataset may be the CIDER dataset that is annotated as described above. Furthermore, the model may be the incon-sistency checker and the resolver described above.

The process may proceeds to operation S704 where a plurality of utterances are received from one or more users. For example, one or more user may be engaged with a chatbot providing the plurality of utterances. The utterances may be similar to utterances A1 and A2 (FIG. 2).

The process may proceed to operation S706 where, using the trained model, a determination is made whether the plurality of utterances include an inconsistency. For example, the determination may be made using a pair check that determines whether a first utterance is inconsistent with a second utterance. In one or more examples, the determination may be made using a diagonal check that determines whether a current utterance is inconsistent with two or more prior utterances. The inconsistency may be determined between utterances from different users.

The process proceeds to operation S708, where based on the determination of the inconsistency, one or more clarifying responses are generated using the trained model. For example, if an inconsistency is detected, a resolver trained based on the CIDER dataset may generate one or more clarifying responses.

The proposed methods disclosed herein may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifi-cations and variations are possible in light of the above disclosure or may be acquired from practice of the imple-mentations.

As used herein, the term component is intended to be broadly construed as hardware, firmware, or a combination of hardware and software.

Even though combinations of features are recited in the claims and/or disclosed in the specification, these combina-tions are not intended to limit the disclosure of possible implementations. In fact, many of these features may be combined in ways not specifically recited in the claims and/or disclosed in the specification. Although each depen-dent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The above disclosure also encompasses the embodiments listed below:

(1) A method for performing consistency detection in a dialogue system, the method comprising: training a model based on an annotated dataset for consistency detection to generate a trained model; receiving a plurality of utterances from one or more users; determining, using the trained model, whether the plurality of utterances include an inconsistency; and based on the determination that the plurality of utterances include the inconsistency, generating, using the trained model, one or more clarifying responses.

(2) The method of feature (1), in which the annotated dataset comprises a training utterance and an annotated utterance that is inconsistent with the training utterance.

(3) The method of feature (2), in which the annotate dataset comprises an annotated explanation of the inconsistency prepared in accordance with a template.

(4) The method of feature (2) or (3), in which the annotated dataset includes an annotated clarifying response.

(5) The method of any one of features (1)-(4), in which the inconsistency is determined by performing a pair check between a first utterance from the plurality of utterances and a second utterance from the plurality of utterances.

(6) The method of any one of features (1)-(5), in which the inconsistency is determined by performing a diagonal check between a current utterance from the plurality of utterances and two or more utterances from the plurality of utterances that are prior to the current utterance.

(7) The method of any one of features (1)-(6), in which the trained model comprises (i) an inconsistency checker model that is trained based on the annotated dataset to detect inconsistencies in a dialogue, and (ii) a resolver model that is trained based on the annotated data set to output the one or more clarifying responses.

(8) An apparatus method for performing consistency detection in a dialogue system, the method comprising: at least one memory configured to store program code; and at least one processor configured to read the program code and operate as instructed by the program code, the program code including: training code configured to cause the at least one processor to train a model based on an annotated dataset for consistency detection to generate a trained model, receiving code configured to cause the at least one processor to receive a plurality of utterances from one or more users, determining code configured to cause the at least one processor to determine, using the trained model, whether the plurality of utterances include an inconsistency, and generating code configured to cause the at least one processor to, based on the determination that the plurality of utterances include the inconsistency, generate using the trained model, one or more clarifying responses.

(9) The apparatus of feature (8), in which the annotated dataset comprises a training utterance and an annotated utterance that is inconsistent with the training utterance.

(10) The apparatus of feature (9), in which the annotate dataset comprises an annotated explanation of the inconsistency prepared in accordance with a template.

(11) The apparatus of feature (9) or (10), in which the annotated dataset includes an annotated clarifying response.

(12) The apparatus of any one of features (8)-(11), in which the inconsistency is determined by performing a pair check between a first utterance from the plurality of utterances and a second utterance from the plurality of utterances.

(13) The apparatus of any one of features (8)-(12), in which the inconsistency is determined by performing a diagonal check between a current utterance from the plurality of utterances and two or more utterances from the plurality of utterances that are prior to the current utterance.

(14) The apparatus of any one of features (8)-(13), in which the trained model comprises (i) an inconsistency checker model that is trained based on the annotated dataset to detect inconsistencies in a dialogue, and (ii) a resolver model that is trained based on the annotated data set to output the one or more clarifying responses.

(15) A non-transitory computer readable medium having instructions stored therein, which when executed by a processor cause the processor to execute a method for performing consistency detection in a dialogue system, the method comprising: training a model based on an annotated dataset for consistency detection to generate a trained model; receiving a plurality of utterances from one or more users; determining, using the trained model, whether the plurality of utterances include an inconsistency; and based on the determination that the plurality of utterances include the inconsistency, generating, using the trained model, one or more clarifying responses.

(16) The non-transitory computer readable medium of feature (15), in which the annotated dataset comprises a training utterance and an annotated utterance that is inconsistent with the training utterance.

(17) The non-transitory computer readable medium of feature (16), in which the annotate dataset comprises an annotated explanation of the inconsistency prepared in accordance with a template.

(18) The non-transitory computer readable medium of feature (16) or (17), in which the annotated dataset includes an annotated clarifying response.

(19) The non-transitory computer readable medium of any one of features (15)-(18), in which the inconsistency is determined by performing a pair check between a first utterance from the plurality of utterances and a second utterance from the plurality of utterances.

(20) The non-transitory computer readable medium of any one of features (15)-(19), in which the inconsistency is determined by performing a diagonal check between a current utterance from the plurality of utterances and two or more utterances from the plurality of utterances that are prior to the current utterance.

What is claimed is:

1. A method performed by at least one processor retrieving one or more instructions from memory for performing consistency detection in a dialogue system, the method comprising:

training a model based on an annotated dataset for consistency detection to generate a trained model, wherein the trained model comprises (i) an inconsistency checker model that is trained based on the annotated dataset to detect inconsistencies in a dialogue, and (ii) a resolver model that is trained based on the annotated data set to output the one or more clarifying responses, wherein each of the inconsistency checker model and the resolver model comprises an encoder-decoder structure that inputs the dialogue and auto-aggressively outputs at least one clarification response;

receiving a plurality of utterances corresponding to a user-to-chatbot conversation comprising at least one user utterance and at least one chatbot response;

determining, using the trained model, whether the plurality of utterances include an inconsistency; and based on the determination that the plurality of utterances include the inconsistency, generating, using the trained model, one or more clarifying responses.

2. The method of claim 1, wherein the annotated dataset comprises a training utterance and an annotated utterance that is inconsistent with the training utterance.

3. The method of claim 2, wherein the annotate dataset comprises an annotated explanation of the inconsistency prepared in accordance with a template.

4. The method of claim 2, wherein the annotated dataset includes an annotated clarifying response.

5. The method of claim 1, wherein the inconsistency is determined by performing a pair check between a first utterance from the plurality of utterances and a second utterance from the plurality of utterances.

6. The method of claim 1, wherein the inconsistency is determined by performing a diagonal check between a current utterance from the plurality of utterances and two or more utterances from the plurality of utterances that are prior to the current utterance.

7. An apparatus method for performing consistency detection in a dialogue system, the method comprising:

at least one memory configured to store program code; and at least one processor configured to read the program code and operate as instructed by the program code, the program code including:

training code configured to cause the at least one processor to train a model based on an annotated dataset for consistency detection to generate a trained model, wherein the trained model comprises (i) an inconsistency checker model that is trained based on the annotated dataset to detect inconsistencies in a dialogue, and (ii) a resolver model that is trained based on the annotated data set to output the one or more clarifying responses, wherein each of the inconsistency checker model and the resolver model comprises an encoder-decoder structure that inputs the dialogue and auto-aggressively outputs at least one clarification response, receiving code configured to cause the at least one processor to receive a plurality of utterances corresponding to a user-to-chatbot conversation comprising at least one user utterance and at least one chatbot response, determining code configured to cause the at least one processor to determine, using the trained model, whether the plurality of utterances include an inconsistency, and generating code configured to cause the at least one processor to, based on the determination that the plurality of utterances include the inconsistency, generate using the trained model, one or more clarifying responses.

8. The apparatus of claim 7, wherein the annotated dataset comprises a training utterance and an annotated utterance that is inconsistent with the training utterance.

9. The apparatus of claim 8, wherein the annotate dataset comprises an annotated explanation of the inconsistency prepared in accordance with a template.

10. The apparatus of claim 8, wherein the annotated dataset includes an annotated clarifying response.

11. The apparatus of claim 7, wherein the inconsistency is determined by performing a pair check between a first utterance from the plurality of utterances and a second utterance from the plurality of utterances.

12. The apparatus of claim 7, wherein the inconsistency is determined by performing a diagonal check between a current utterance from the plurality of utterances and two or more utterances from the plurality of utterances that are prior to the current utterance.

13. A non-transitory computer readable medium having instructions stored therein, which when executed by a processor cause the processor to execute a method for performing consistency detection in a dialogue system, the method comprising:

training a model based on an annotated dataset for consistency detection to generate a trained model, wherein the trained model comprises (i) an inconsistency checker model that is trained based on the annotated dataset to detect inconsistencies in a dialogue, and (ii) a resolver model that is trained based on the annotated data set to output the one or more clarifying responses, wherein each of the inconsistency checker model and the resolver model comprises an encoder-decoder structure that inputs the dialogue and auto-aggressively outputs at least one clarification response;

receiving a plurality of utterances corresponding to a user-to-chatbot conversation comprising at least one user utterance and at least one chatbot response;

determining, using the trained model, whether the plurality of utterances include an inconsistency; and based on the determination that the plurality of utterances include the inconsistency, generating, using the trained model, one or more clarifying responses.

14. The non-transitory computer readable medium of claim 13, wherein the annotated dataset comprises a training utterance and an annotated utterance that is inconsistent with the training utterance.

15. The non-transitory computer readable medium of claim 14, wherein the annotate dataset comprises an annotated explanation of the inconsistency prepared in accordance with a template.

16. The non-transitory computer readable medium of claim 14, wherein the annotated dataset includes an annotated clarifying response.

17. The non-transitory computer readable medium of claim 13, wherein the inconsistency is determined by performing a pair check between a first utterance from the plurality of utterances and a second utterance from the plurality of utterances.

18. The non-transitory computer readable medium of claim 13, wherein the inconsistency is determined by performing a diagonal check between a current utterance from the plurality of utterances and two or more utterances from the plurality of utterances that are prior to the current utterance.

* * * * *